US012806630B2

(12) United States Patent
Han et al.

(10) Patent No.: US 12,806,630 B2
(45) Date of Patent: Nov. 24, 2026

(54) INTERDIGITATED ELECTRODE-BASED DROPLET MANIPULATION IN MICROFLUIDIC SYSTEMS

(71) Applicant: The Texas A&M University System, College Station, TX (US)

(72) Inventors: Arum Han, College Station, TX (US); Can Huang, Houston, TX (US); Adrian Ryan Guzman, College Station, TX (US); Han Zhang, College Station, TX (US); Jing Dai, College Station, TX (US); Rohit Kunal Gupte, College Station, TX (US)

(73) Assignee: The Texas A&M University System, College Station, TX (US)

( * ) Notice: Subject to any disclaimer, the term of this patent is extended or adjusted under 35 U.S.C. 154(b) by 205 days.

(21) Appl. No.: 18/721,660

(22) PCT Filed: Dec. 23, 2022

(86) PCT No.: PCT/US2022/053973

§ 371 (c)(1),
(2) Date: Jun. 19, 2024

(87) PCT Pub. No.: WO2023/122339

PCT Pub. Date: Jun. 29, 2023

(65) Prior Publication Data

US 2025/0050353 A1 Feb. 13, 2025

Related U.S. Application Data

(60) Provisional application No. 63/293,812, filed on Dec. 26, 2021.

(51) Int. Cl.
*B03C 11/00* (2006.01)
*B01L 3/00* (2006.01)
(Continued)

(52) U.S. Cl.
CPC ........ *B03C 11/00* (2013.01); *B01L 3/502761* (2013.01); *B03C 5/005* (2013.01);
(Continued)

(58) Field of Classification Search
None
See application file for complete search history.

(56) References Cited

U.S. PATENT DOCUMENTS 11,052,407 B1 7/2021 Han et al.
2018/0135117 A1 5/2018 Link
2019/0314820 A1 10/2019 Geng et al.

FOREIGN PATENT DOCUMENTS

WO 2012056192 A1 5/2012

OTHER PUBLICATIONS

K.-H. Han, et al., "Lateral displacement as a function of particle size using a piecewise curved planar interdigitated electrode array", Lab on a Chip, 9(20): p. 2958-2964 (Year: 2009).*

(Continued)

*Primary Examiner* — J. Christopher Ball
(74) *Attorney, Agent, or Firm* — Jackson Walker LLP

(57) ABSTRACT

In an embodiment, the present disclosure pertains to a droplet system, apparatus, or fluid sample testing system to accomplish high-precision and high-efficiency droplet manipulation (e.g., greater than 99% platform operation efficiency). In some embodiments, the droplet system, apparatus, or fluid sample testing system includes at least one microfluidic channel or chamber and at least one interdigitated electrode (IDE) that can create a localized electric field below and/or within at least one fluidic channel or chamber. In some embodiments, this allows size-specific and/or size-dependent droplet manipulation.

19 Claims, 12 Drawing Sheets

(51) Int. Cl.

| | |
|---|---|
| ***B03C 5/00*** | (2006.01) |
| ***B03C 5/02*** | (2006.01) |
| ***G01N 15/14*** | (2024.01) |
| ***G01N 15/1492*** | (2024.01) |
| ***G01N 27/447*** | (2006.01) |

(52) U.S. Cl.

CPC ......... *B03C 5/026* (2013.01); *G01N 15/1492* (2024.01); *G01N 27/44791* (2013.01); *B01L 2200/0636* (2013.01); *B01L 2300/0864* (2013.01); *B01L 2400/0421* (2013.01); *G01N 2015/1481* (2013.01)

(56) References Cited

OTHER PUBLICATIONS

Zhang, Han et al.; "Fidelity: A Quality Control System for Droplet Microfluidics"; Science Advances, vol. 8, Issue 27, Jul. 8, 2022, 11 pages.

* cited by examiner

| OPERATION CODE | #1 | #2 | #3 | #4 |
|---|---|---|---|---|
| OUTLET 1: | 1 | 0 | 1 | 0 |
| OUTLET 2: | 1 | 0 | 0 | 0 |
| OUTLET 3: | 0 | 0 | 0 | 0 |
| OUTLET 4: | 0 | 1 | 0 | 0 |
| OUTLET 5: | 0 | 1 | 0 | 1 |

INTERDIGITATED ELECTRODE-BASED DROPLET MANIPULATION IN MICROFLUIDIC SYSTEMS

CROSS-REFERENCE TO RELATED APPLICATIONS

This patent application claims priority from, and incorporates by reference the entire disclosure of, U.S. Provisional Application 63/293,812 filed on Dec. 26, 2021.

STATEMENT REGARDING FEDERALLY SPONSORED RESEARCH

This invention was made with government support under W911NF1920013 awarded by the Defense Advanced Research Projects Agency. The government has certain rights in the invention.

TECHNICAL FIELD

The present disclosure relates generally to microfluidic systems and more particularly, but not by way of limitation, to interdigitated electrode (IDE)-based droplet manipulation in microfluidic systems.

BACKGROUND

This section provides background information to facilitate a better understanding of the various aspects of the disclosure. It should be understood that the statements in this section of this document are to be read in this light, and not as admissions of prior art.

Manipulating droplets is one of the most critical functions in droplet microfluidic systems. Electric field-based manipulation (i.e., the use of dielectrophoretic (DEP) force) is one of the most widely used methods. However, current methods do not provide sufficiently precise manipulation of droplets, resulting in unwanted neighboring droplets being also manipulated or affected by the DEP force. These characteristics contribute to a high error rate in droplet microfluidics-based assays, and ultimately limit the utility and efficiency of such assay systems as well as their throughput.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a droplet system for high-precision and high-efficiency droplet manipulation (e.g., greater than 99% platform operation efficiency). In some embodiments, the droplet system includes at least one microfluidic channel or chamber and at least one interdigitated electrode (IDE) that creates a localized electric field below and/or within at least one fluidic channel or chamber.

In some embodiments, the droplet system has greater than 99% platform operation efficiency. In some embodiments, the droplet system is a fluid sample testing system. In some embodiments, the droplet system includes one or more microfluidic channels. In some embodiments, the droplet system includes one or more IDEs. In some embodiments, a fluidic part of the droplet system is a material that can include, without limitation, poly dimethyl siloxane (PDMS), glass, thermoplastic, silica, and combinations thereof. In some embodiments, the IDE is a material that can include, without limitation, Au, Ag, Ti, Cr, Cu, indium tin oxide (ITO), and combinations thereof.

In some embodiments, at least one IDE or the at least one microfluidic channel or chamber join at an angle. In some embodiments, the angle is at least one of smaller or larger than 90°, or equal to 90°, in relation to an adjacent channel. In some embodiments, the angle is 90°. In some embodiments, at least one IDE is located on either a top, a bottom, or a side of the at least one fluidic channel or chamber.

In some embodiments, operating voltages are in a range of several to hundreds of volts. In some embodiments, operating frequencies are in a range of 1 to 100 kHz. In some embodiments, the droplet system is operated at a variety of different throughputs ranging from 1 to 1,000 droplets/sec.

In some embodiments, the at least one IDE has a shape that can include, without limitation, straight, curved, angled, and combinations thereof. In some embodiments, the at least one fluidic channel or chamber has a shape that can include, without limitation, straight, curved, angled, and combinations thereof. In some embodiments, a width of at least one of each finger, a gap between fingers, or a length of the at least one IDE is in a range of several to hundreds of microns. In some embodiments, a height of the at least one fluidic channel or chamber is in a range of several to hundreds of microns.

In some embodiments, a size of droplets to be manipulated varies in a range from several to hundreds of microns. In some embodiments, the at least one IDE is at least one of directly in contact or a proximity to a substance in the at least one fluidic channel or chamber. In some embodiments, the at least one of directly in contact or a proximity to a substance is in a range of 0 to 0.5 μm. In some embodiments, the at least one of directly in contact or a proximity to a substance is in a range of 0 to 30 μm.

In some embodiments, the at least one IDE is at least one of directly exposed to a solution in the at least one fluidic channel or chamber, or coated by a repellent layer. In some embodiments, the repellent layer is composed of a composition that can include, without limitation, a saline hydrophobic coating, $SiO_2$, $Si_3N_4$, and combinations thereof. In some embodiments, at least one of water-in-oil or oil-in-water droplets are utilized.

In some embodiments, an aqueous phase is a composition that can include, without limitation, of biochemical reagents, large beads, large particles, cells, gel droplets, and combinations thereof that are relatively close in diameter to an encapsulated droplet or much smaller than the encapsulated droplet. In some embodiments, different carrier oils including at least one of heavier or lighter densities than a droplet phase of a fluid sample is utilized. In some embodiments, the droplet system utilizes multi-emulsion droplet schemes that lead to generation of double or more emulsion droplets. In some embodiments, the double or more emulsion droplets that can include, without limitation, triple, quadruple, core/shell, multicore, and combinations thereof.

In some embodiments, a system of microfluidic channels is composed of that can include, without limitation, at least one of a single layer of microfluidic channels or multiple layers of microfluidic channels stacked in any spatial direction with respect to a base plane. In some embodiments, the at least one IDE is used as a guiding track to manipulate droplets, and the droplets follow an IDE track. In some embodiments, droplets that are sufficiently close to the at least one IDE surface can be manipulated while droplets that are farther away from the at least one IDE surface are minimally disturbed, or undisturbed, and thus continue to follow an original flow path.

In some embodiments, droplets that have diameters smaller than the droplet manipulation channel height naturally float up, if the density of carrier fluid is higher than that of the droplet fluid, and away from the at least one IDE surface so that those droplets are minimally disturbed, or undisturbed, by an electric field generated by the at least one IDE, thereby enabling size-based selective droplet manipulation.

In some embodiments, the droplets that have diameters smaller than the droplet manipulation channel height naturally sink, if the density of carrier fluid is lower than that of the droplet fluid, and away from the at least one IDE surface so that those droplets are minimally disturbed, or undisturbed, by an electric field generated by the at least one IDE thereby enabling size-based selective droplet manipulation.

In some embodiments, the at least one IDE is used to sort droplets of interest that have been identified by a spectroscopy detection modality that can include, without limitation, fluorescence, impedance, optical density, Raman, infrared (IR), mid-IR, radio frequency (RF), and combinations thereof.

In some embodiments, there are any number of outlets for droplets to be sorted to. In some embodiments, an array of IDEs is used to guide and sort droplets of interest that have been identified by a spectroscopy detection modality can include, without limitation, fluorescence, impedance, optical density, Raman, IR, mid-IR, RF, and combinations thereof.

In some embodiments, an array of IDEs is used to guide droplets to a desired location on-chip for real-time time-lapse imaging and analysis using spectroscopy detection modalities that can include, without limitation, fluorescence, impedance, optical density, Raman, IR, mid-IR, RF, and combinations thereof.

In some embodiments, a series of IDEs are used to sort out droplets of a desired size range using a combination of one or more filters that can include, without limitation, highpass, lowpass, bandpass, and combinations thereof. In some embodiments, microfluidic channel height changes for the different IDE-based droplet manipulation units along the microchannel so that size-based droplet manipulation is enabled and be more efficient. In some embodiments, a series of IDEs are used as a droplet diameter quality control system for at least one of droplet generation, droplet merging, droplet splitting, or in combination with any other droplet system. In some embodiments, an IDE or array of IDEs merge droplets that are passing the IDE in a fluidic channel or are stationary above the IDE. In some embodiments, an IDE or array of IDEs are used to slow, stop, or hold droplets that are passing or are positioned above the IDEs in a fluidic channel or chamber.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 6A shows a schematic demonstrating the three functional sections and workflow of the bandpass filter system. FIG. 6B shows the cross-section view (A to A') of the reflow, spacing, and lifting junction. FIG. 6C shows an example IDE design with 6 μm finger width and 6 μm spacing positioned underneath the two IDE-based droplet sorting areas. FIG. 6D shows the outlet channel with an expansion of height at B to B' to remove larger droplets. FIG. 6E shows the height of the main channel was reduced from 120 μm to 80 μm to adjust the effective range of the captured target droplet size, removing smaller droplets from the system.

DETAILED DESCRIPTION

Figure 1:
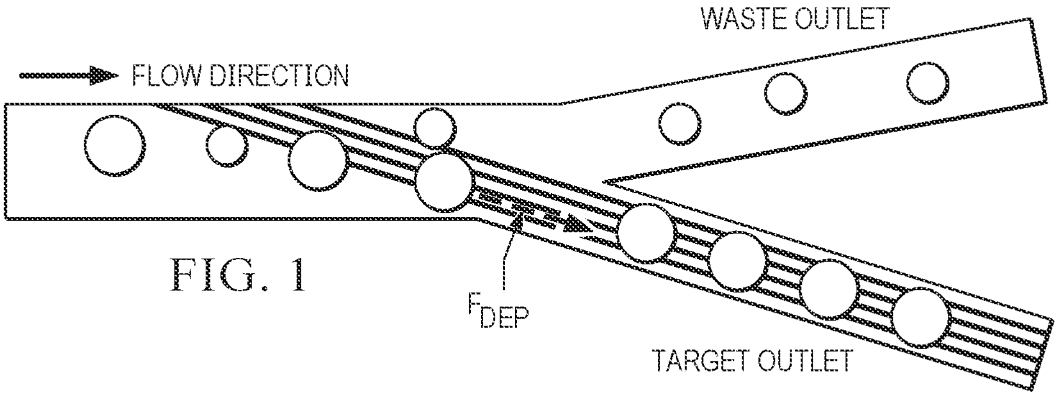
FIG. 1 illustrates the basic theory and working principle of the interdigitated electrode (IDE)-based droplet manipulation and sorting, where the top view of the sorting region showing that larger droplets have a different trajectory due to the combination of buoyancy that cause droplets to move away from the surface IDE combined with the highly localized IDE-induced electric field.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

The use of interdigitated electrodes (IDE) as surface electrodes has been widely utilized for dielectrophoretic (DEP) manipulation of particles. Despite their broad utility, they have not been utilized for droplet manipulation. IDEs can provide a highly localized, strong, and finely controllable electric field compared to three-dimensional (3D) electrode designs that are currently most commonly utilized and preferred in droplet manipulation, and such characteristics could greatly benefit precise control of droplets in ultra-high-throughput microfluidic systems.

Microfluidic platforms are beginning to become widely accepted as high-throughput screening systems for conducting complex assays using a fraction of the reagents and conducted in a fraction of time when compared to conventional bulk fluidic assays. The capability to conduct complex high-throughput single-cell resolution analyses with minimum handling at a fraction of the cost and enhanced sensitivity/accuracy is a powerful tool especially in applications such as drug discovery, pathogen detection, and drug screening, to name a few.

Currently, two-dimensional (2D) planar electrodes having one opposing pair of electrodes and 3D electrodes, including but not limited to, 3D needles, 3D liquid metals, and 3D channels filled with sodium chloride, are the most commonly reported and utilized electrodes system for droplet manipulation. These electrodes are oriented aside from a target fluidic channel. The operational voltages of these side electrode systems are typically high (500-1000 V). The effective regions of the resulting electric fields are broad, and thus electric field shielding systems are typically needed to prevent the electric field from affecting the droplets in other parts of the system, which can, for example, cause unwanted droplet merging in those other regions. Since the generated electric field that affects the droplets is not localized in these conventional methods, the precise control of droplets is much more difficult. The developed IDE systems of the present disclosure are located vertically in proximity to the target droplets. Due to the nature of the highly localized electric field generated by IDEs, such method allows for far more precise control of droplets in not only the x-y plane, but also the z-direction. As a result of this, the performance, in terms of efficiency and resolution, of the methods presented herein are significantly better than that of conventional methods. In addition, the operational voltage is low (e.g., 5-20 V at 10 kHz), hence no electric field shielding structure is needed. The low voltage requirement also opens up the possibility of enabling highly efficient and small portable/field-based systems using droplet microfluidic technologies.

The present disclosure utilizes the IDE for on-the-fly active manipulation of droplets in microfluidic devices. Four theories and/or functions of this disclosure, include, without limitation are: (1) an IDE track for droplet guiding; (2) an IDE for size-based droplet manipulation; (3) an IDE to control the speed of droplets; and (4) an IDE for droplet merging. These four theories and/or functions are described in further detail below.

Figure 2:
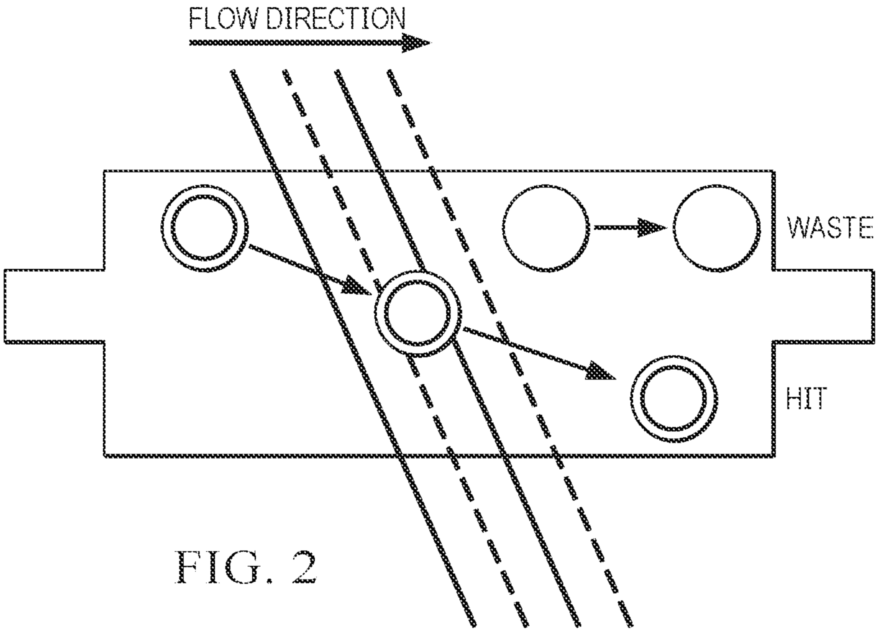
FIG. 2 illustrates a schematic showing the IDE-based droplet sorter and its highly localized effective area (angled shaded area). In contrast, the electric field (EF) of conventional planar and three-dimensional electrode-based sorters require a much larger voltage and cover a much larger area than the IDE sorter, which generates EF in a much broader area and thus have a higher risk of inadvertently sorting unwanted droplets.

Function 1 (FIG. 1 and FIG. 2): IDE track for droplet guiding. The nature of the small footprint, strong electric field (EF), and highly localized electric field allow the IDE to be utilized as a droplet guiding track. When the droplet is in close proximity to the IDE surface, a strong DEP force can be induced to pull the droplet towards the IDE surface. Depending on the IDE pattern, the droplet's trajectory will follow the direction of the IDE pattern, following in whatever direction the IDE pattern proceeds in. This allows the droplet trajectory to be gradually changed to the final desired position. This droplet guiding allows more accurate control over the droplet movement compared to conventional droplet manipulation methods as discussed in further detail below and can be seen in FIG. 1 and FIG. 2.

Figure 3:
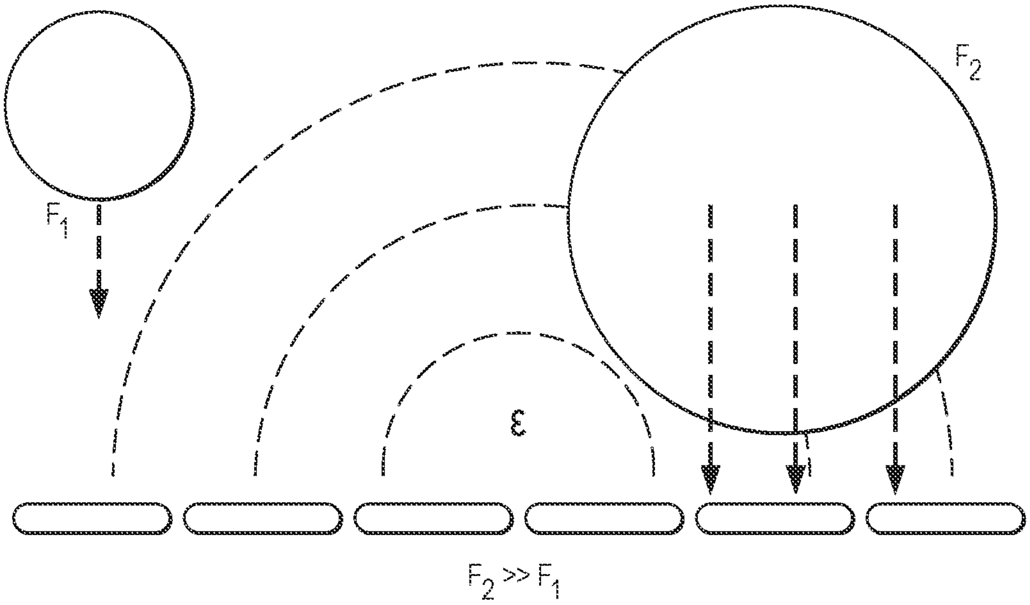
FIG. 3 illustrates the basic theory and working principle of the IDE-based droplet size-dependent filter. The cross-section view of the sorting region shows that larger droplets experience a much stronger force due to their closer proximity to the IDE surface, while the smaller droplets, which are effected by buoyancy and thus float to the ceiling part of the microchannel, experience a much weaker DEP force due to their large distance from the IDE surface.

Function 2 (FIG. 3): IDE for size-based droplet manipulation. Coupling the highly localized electric field to the IDE surface with the buoyancy phenomenon caused by the density difference between the aqueous droplet content and the surrounding carrier oil, IDE-based electrodes are capable of selective manipulation of droplets depending on the droplet size. The DEP force is strongest near the IDE, and then exponentially reduces away from the electrode surface (in the z-direction). Thus, droplets that are large enough to fill the cross-section of the droplet flow channel will be affected the most by the localized electric field and will experience the strongest DEP force. In contrast, the buoyancy phenomenon will lift smaller droplets to the ceiling of the microfluidic channel and away from the IDE surface, reducing the DEP force applied to these smaller droplets. These differences in DEP force can be utilized to selectively move droplets of only certain sizes while letting smaller droplets flow unhindered to a separate outlet channel. This is illustrated in FIG. 3.

Figure 4:
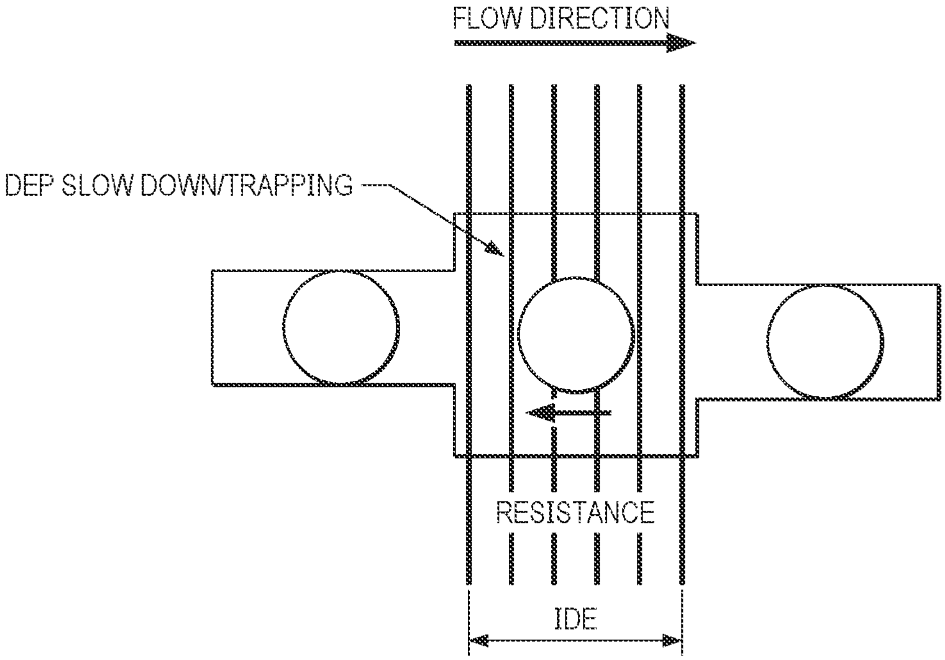
FIG. 4 illustrates a top view of the IDE-based droplet speed controlling system, showing an example of a speed controller that is using DEP force generated by an IDE-based electric field to slow down and/or trap the droplets is shown.

Function 3 (FIG. 4): IDE to control the speed of droplets. With the adjustment of voltage, along with an expanding microfluidic channel design with the IDE patterns, the localized electric field allows IDE-based DEP forces to slow down and/or trap droplets at a desired location. The droplets can be released by decreasing and/or turning off the applied voltage. The speed of deceleration is positively correlated to the voltage applied. This is illustrated in FIG. 4.

Figure 5:
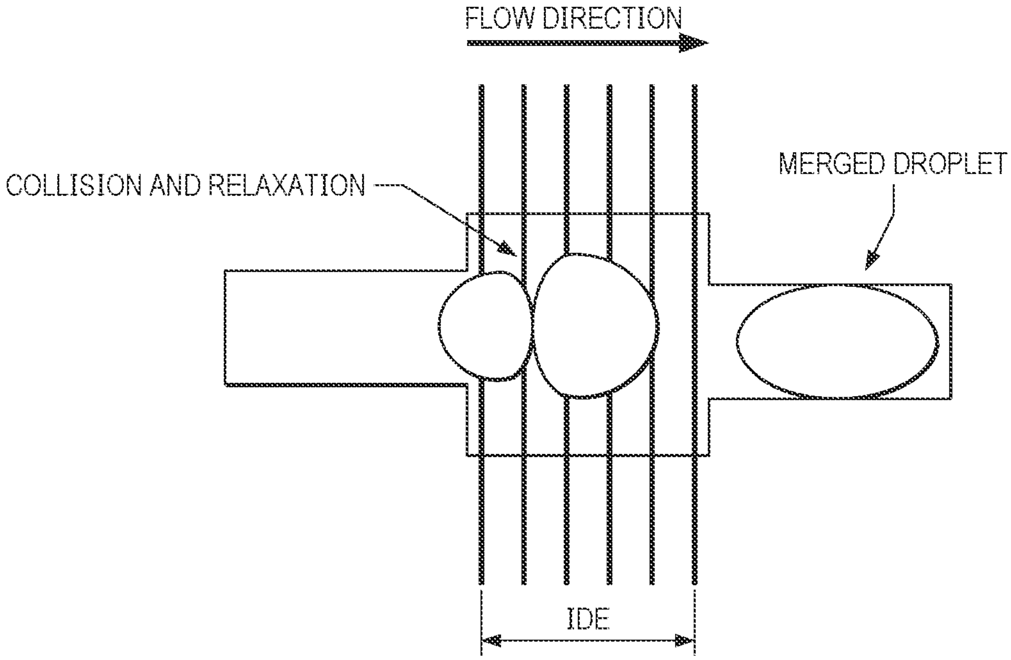
FIG. 5 illustrates a top view of the IDE-based droplet merging system, showing the collision and relaxation force due to the volume expansion and droplet momentum, as well as the slowing effects from the IDE array-generated highly localized but intense electric field, which allows droplet-to-droplet merging to be achieved at an extremely low voltage (as low as few volts).
Figure 6A:
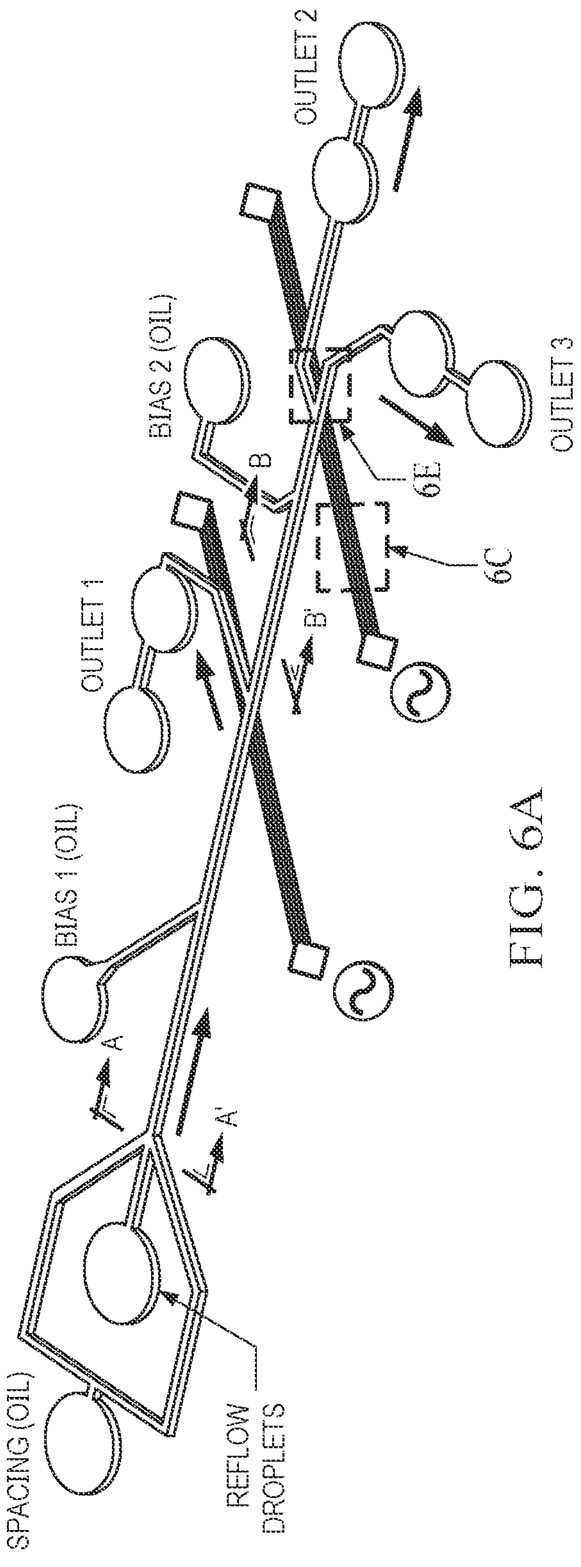
FIGS. 6A-6E illustrate the structure of the droplet bandpass filter and its working principle.
Figure 6B:
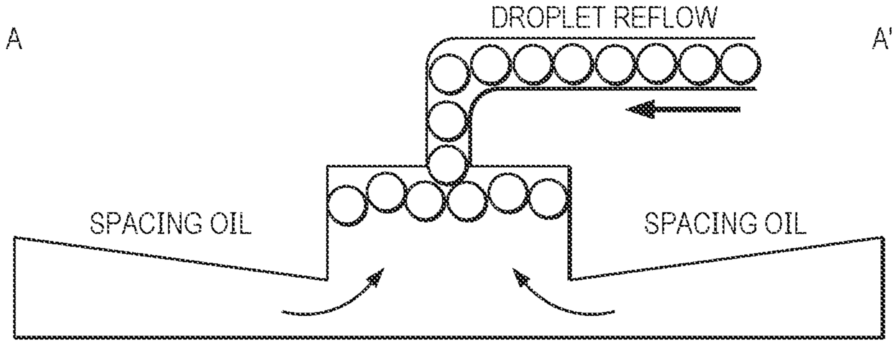
Figure 6C:
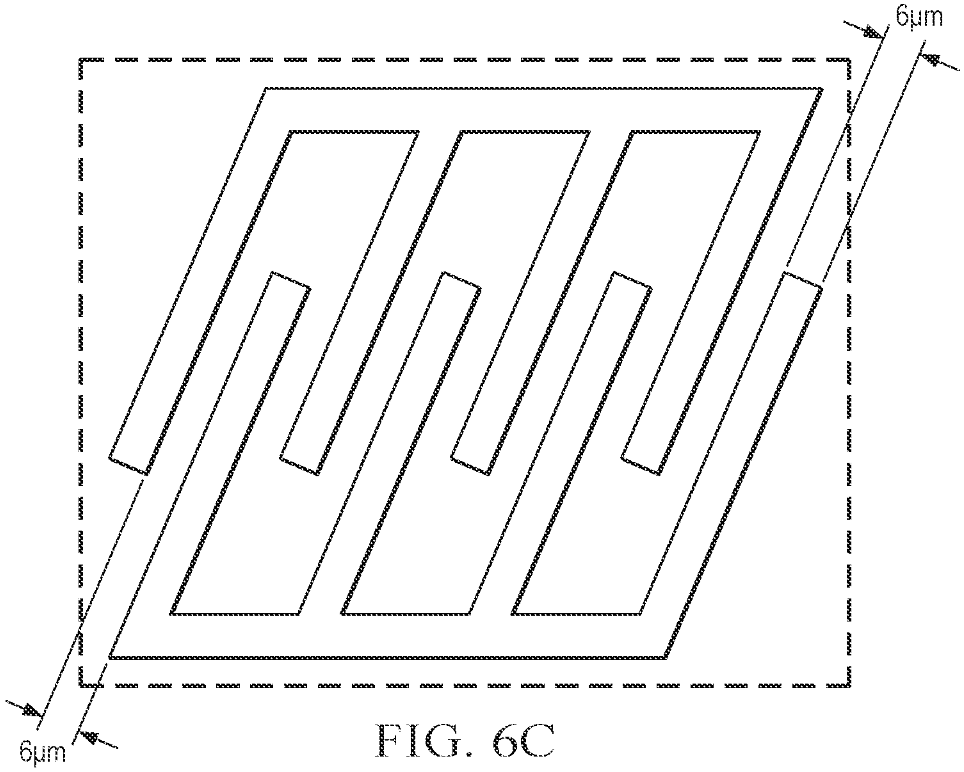
Figure 6D:
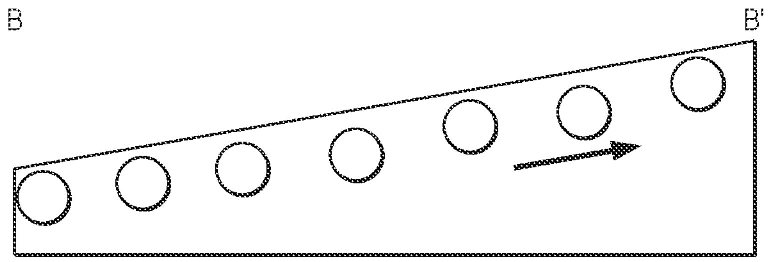
Figure 6E:
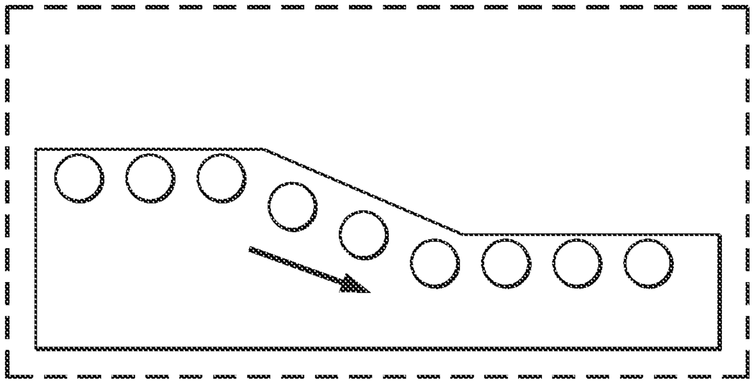

Function 4 (FIG. 5): IDE to merge droplets. With the combination of collision and relaxation effects at the volume expansion site, the highly localized electric field (generated by IDE patterns with low applied voltage) allows paired droplets to be merged in a highly effective manner at the IDE merging region. The low voltage and small duration of exposure can minimize the negative electrical stimuli on the encapsulated biological compounds/organisms during droplet manipulation. This is illustrated in FIG. 5.

It should be noted that the basic operating principle is different from that of digital microfluidics, where it utilizes the fact that surface tension in the air-liquid-solid interface can be controlled by an electric field, whereas here it is due to the highly localized electric field in the solid-liquid interface. Furthermore, all manipulations demonstrated herein are suitable for robust on-the-fly and real-time manipulation in an extremely high-throughput free-flowing continuous format.

In addition to the unique capability provided, as described in detail above, the IDE systems can have many additional advantages. For example, the highly localized electric field provides more precise and accurate control of droplets at a 3D level, whereas other methods lack z-direction control or x- and y-direction control. Furthermore, the energy consumption of the IDE systems presented herein is significantly lower than that of conventional methods. This can lead to the possibility of portable and/or field-deployable droplet microfluidic systems, as the use of a large power source or large equipment can be circumvented. Moreover, due to the high localization of the electric field, there is no need for electrical shielding, which is normally an essential part for conventional droplet merger/sorter schemes due to the large effective electric field areas produced by such conventional methods. In the systems that currently exist, electric shielding is generally needed to minimize errors in a droplet operation. Also, due to the compactness of the IDE design, multiple IDE-based droplet manipulation units can therefore be integrated within a fairly small footprint, which can significantly increase the versatility and compactness of microfluidic systems.

Working Examples

Reference will now be made to more specific embodiments of the present disclosure and data that provide support for such embodiments. However, it should be noted that the disclosure below is for illustrative purposes only and is not intended to limit the scope of the claimed subject matter in any way.

Application 1 (FIG. 2 and part of FIGS. 6A-6E): IDE-based droplet sorting system. Microfluidic droplet sorting systems allow the selection of subpopulations of cells, nucleic acids, and other forms of biomolecules at extremely high throughput. DEP is widely used for droplet sorting because it generates a relatively strong force on droplets, actuates rapidly, has a relatively low cost, and is easy to be integrated into microfluidic chips. Disclosed herein is an example microfluidic device that utilizes IDE tracks for droplet guiding, as described above. The device as disclosed herein can contain a droplet sorting geometry that uses IDE electrodes to localize the sorting electric field. The device, in general, includes two parts: (1) the droplet reflow and spacing part; and (2) the droplet detection and sorting part. Droplets are first introduced into the system and spaced to a certain distance by adding a carrier oil between droplets. In the second part, instead of placing the electrodes at one side of the channel (either planar or 3D electrode designs), as conventionally done, the IDEs are located underneath the fluidic sorting channel to serve as a droplet guiding track system. The laser detection and feedback control system trigger the IDE electric field when droplets with desired signals (e.g., fluorescent signal) are detected. The droplets will then move along with the IDE pattern to achieve the manipulation and sorting procedure.

The described IDE-based droplet sorting system has at least the following advantage of high efficiency (e.g., greater than 99%). The highly localized electric field only sorts the droplet that is right above the guide track when the IDE is activated, which minimizes the false-positive cases that are typically caused by an unwanted large EF coverage with conventional 3D electrode designs. While conventional droplet sorting methods are limited in the size of droplets that can be actively sorted, IDE electrode designs can be easily expanded to include the sorting of larger or smaller droplets, providing a larger range of applications that previously could not be attained at high efficiency. The required droplet-to-droplet spacing is much smaller due to the highly localized electric field covering only a small area, which could greatly improve the sorting throughput under the same resource consumption conditions.

Application 2 (FIGS. 6A-6B): Size-dependent droplet filter. In most droplet microfluidic applications, high-quality monodispersed droplets are required for active droplet manipulations as devices are designed and optimized for operating with droplets of a specific size, or size range. However, the presence of errant droplets (droplets of different sizes) is oftentimes inevitable, especially in complex multi-stage sequential droplet manipulation systems. Examples of such errors include, for example, unwanted droplet merging, double droplet merging, and unwanted droplet splitting, and the like. Thus, a method that can actively remove droplets with an unwanted size can be highly valuable to further advance the capability and throughput of droplet microfluidic systems, as removal of abnormal-sized droplets can greatly increase the accuracy and efficiency of microfluidic platforms while also reducing unnecessary throughput load to the system.

The devices of the present disclosure take advantage of the natural buoyancy induced by the density difference between the aqueous droplet content and the carrier oil. Theoretically, floating droplets at different z-positions will be affected by differential magnitudes of DEP force, therefore resulting in completely different droplet trajectories during droplet DEP manipulation. To provide sufficient buoyancy, this design requires the density of the carrier oil to be as different as possible from that of the aqueous droplets. For example, fluorinated oil, which is the most frequently used carrier oil in droplet microfluidics, meets this requirement. For the case that the density of carrier oil is lower than that of the aqueous solution, the IDE system can be placed on top of the fluidic channel since the aqueous droplet will sink, achieving the electric force-based droplet filtration as described herein, providing extra versatility in its application.

The planar IDEs are fabricated underneath or above the microfluidic channel to generate a localized electric field along the z-axis. When the droplet diameter is close to, or greater than, the channel height, the bottom of the buoyant droplet is in close proximity to the IDE surface. As a result, a strong DEP force can be induced and the droplet's trajectory can be altered based on the design of the IDE pattern. However, when the droplet size is less than the channel height, the buoyant droplet will be away from the IDE surface as the droplet floats up and reach the microfluidic channel ceiling, and thus will receive a significantly lower, or negligible DEP force. Thus, the smaller droplets' trajectories will be dictated by the Stokes' drag force and will follow the streamline of the carrier oil. With fine control of the channel height of the microfluidic device, the IDEs can guide larger droplets to the collection outlet while smaller droplets continue to flow to a "waste" outlet. Each of the above-described microfluidic units can serve as either a high-pass filter or a low-pass filter in terms of droplet size. Thus, a droplet band-pass filter can be achieved by the combination of one or more high-pass filters and low-pass filters.

The device includes three sections to achieve the respective functions: Section 1: droplet reflow and lifting; Section 2: droplet size low-pass filter; and Section 3: droplet size high-pass filter. The desired droplets are picked out by adjusting the channel geometry and applied voltage accordingly. In Section 1 the droplet reflow and lifting section, the poly-dispersed droplet population is reflowed into the system. In contrast with conventional oil spacing channels, the height of these oil spacing channels is intentionally designed to be about half of the droplet reflow channel. The purpose of this design is to create a sheath of oil underneath the reflowed droplets while spacing them out, thus lifting the droplets to the ceiling of the microfluidic channel before approaching the IDE-patterned region. Even though droplets naturally float up due to their buoyancy, this design helps the droplets to float up more rapidly, reducing the overall footprint of the design. In Section 2 where the first IDE array is patterned, due to the highly localized electric field generated by the IDE array and the high channel height, the large droplets are guided by the DEP force towards the first outlet. The height of the main channel is then decreased to be comparable with the desired droplet size (which is necessary for actuation) before entering the second IDE patterned section (Section 3). In Section 3 where the second IDE array is patterned, due to the highly localized electric field generated by the IDE array and the high channel height, the DEP force pulls out all the droplets within the desired size range into Outlet 2, while allowing the smaller droplets to move undisturbed and into Outlet 3. Similar to Section 2, the adjusted channel height of Section 3 allows the DEP force to pull out all the droplets with the desired size to the collection outlet and discard droplets with smaller sizes.

The described size-dependent droplet filter has at least the following advantage, enabling the separation of droplets with discrimination resolution that is as little as 7 μm (diameter). The demonstrated filtration efficiency is shown to be consistently higher than 99% at various throughputs (5-100 droplets/sec). This filter can be used in integrated microfluidic systems, or in conjunction with other droplet manipulation devices as a droplet size quality control system, getting rid of micelles as well as droplet sizes that are a hindrance to downstream droplet manipulation processes.

Figure 7:
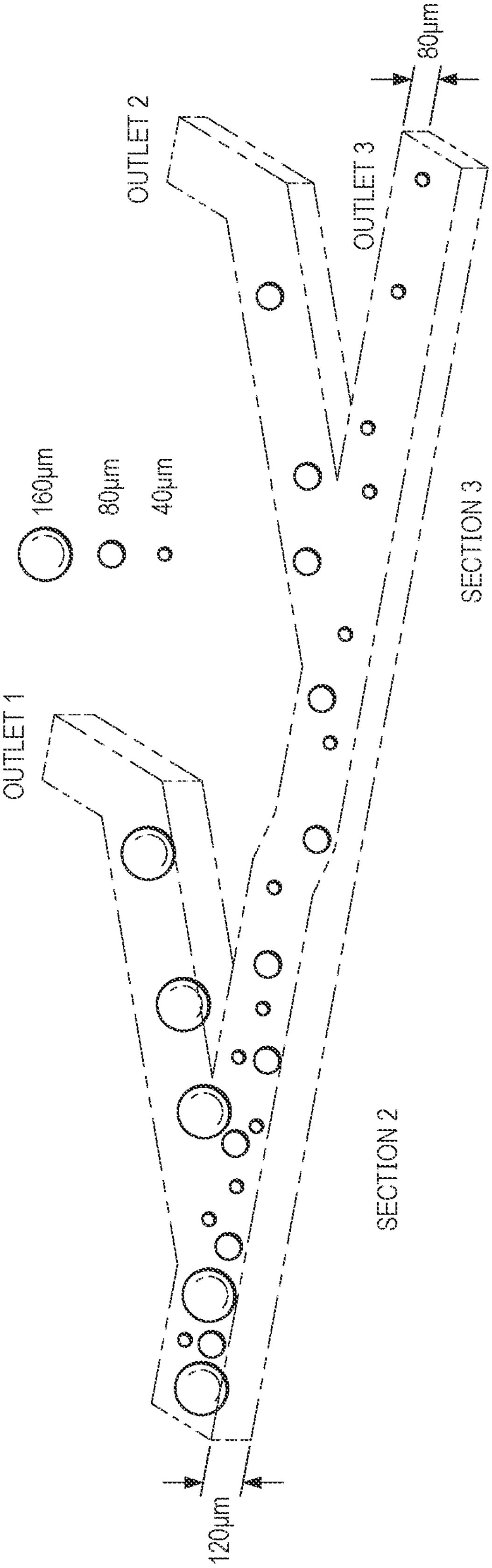
FIG. 7 illustrates a schematic for a proof of concept validation using a 120 μm to 80 μm bandpass filter.

FIG. 7 illustrates a schematic for a proof of concept validation using a 120 μm to 80 μm bandpass filter. In some embodiments, the bypass filter can utilized a 100 μm to 90 μm bandpass filter.

Figure 8:
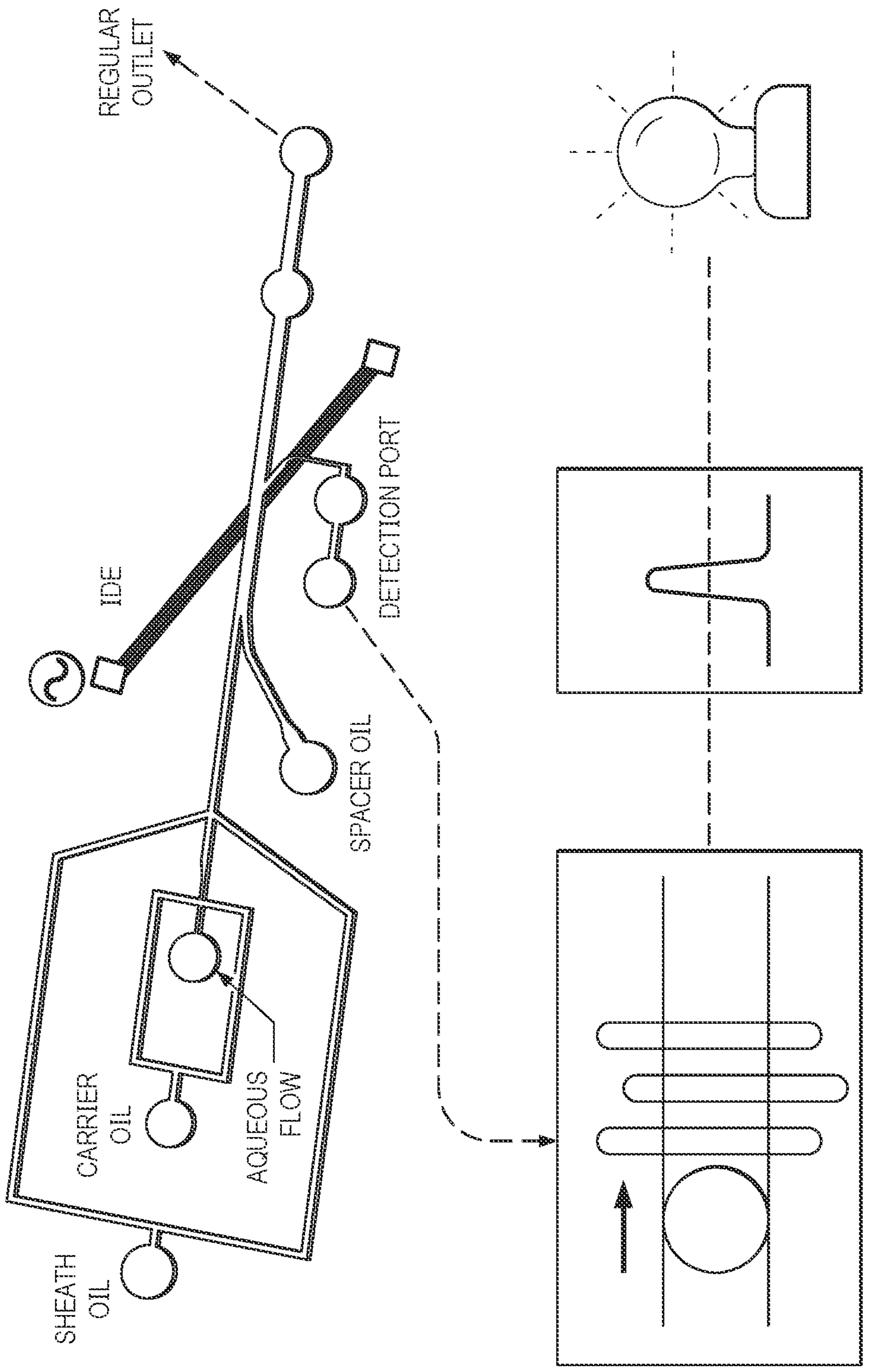
FIG. 8 illustrates an application of the droplet bandpass filter system toward quality control of droplet sizes. A downstream impedance-based droplet detector is triggered if a droplet of unwanted size is pulled into the waste channel due to the droplet bandpass filter, where such triggers indicate that the droplet size has been changed.

Application 3 (FIG. 8): Droplet size quality control and alarm trigger. The droplet highpass, bandpass, or bandpass filter can be utilized for droplet size quality control, where the detection of unwanted droplet size can trigger an alarm for the user/operator of the microfluidic system. Here, if all droplets are within the desired size range, all droplets flow into the regular outlet and no droplet flows into the detection outlet. However, if droplets of different sizes are flowing in the microfluidic channel using either/or a highpass filter or lowpass filter the droplets outside of the desired range will be pulled into the detection port. The detection port can have a droplet detector, for example, optical or impedance, where the presence of such droplets indicates that the droplets are not within the wanted size range. In a variation to this design, the device can be designed in such a way that only the desired size range droplets are pulled by the IDE-based DEP force, flowing into the regular outlet. If any droplets of smaller sizes flow in, they will flow unobstructedly and into the detection port. Any other variation is possible for droplet quality control.

Application 4: Multi-parametric microfluidic droplet sorter. False-positive errors are the major source that affects the performance and efficiency of a droplet sorter. False positives are caused by pulling incorrect droplets or pulling more than one droplet during each droplet sorting trigger due to the excess and broad electric field exhibited by planar or 3D electrodes, or by merged droplets (contaminated by other droplets) and broken droplets (containing information that is partially missing) entering the sort channel, reducing the sorting efficiency and accuracy.

To address these problems, a two-metric microfluidic droplet sorter is accomplished by the combination of the fluorescent-activated laser detection system mentioned in Application 1 and the size-dependent bandpass filter expounded in Application 2. Such a sorter enables selecting and sorting only the droplets that have both positive signals and the correct size. This multi-parametric sorter improves reducing false positives as well as systems' tolerance to deal with polydispersity of droplets, which greatly improves the overall sorting efficiency.

The described two-metric microfluidic droplet sorter has at least the following advantage of being a system that is the first of its kind that makes decisions based on more than one metric. The sorting efficiency of the system, which is greater than 99.9%, is even higher than the design described in Application 1, as it also accounts for the removal of the droplets with unwanted size.

Figure 9:
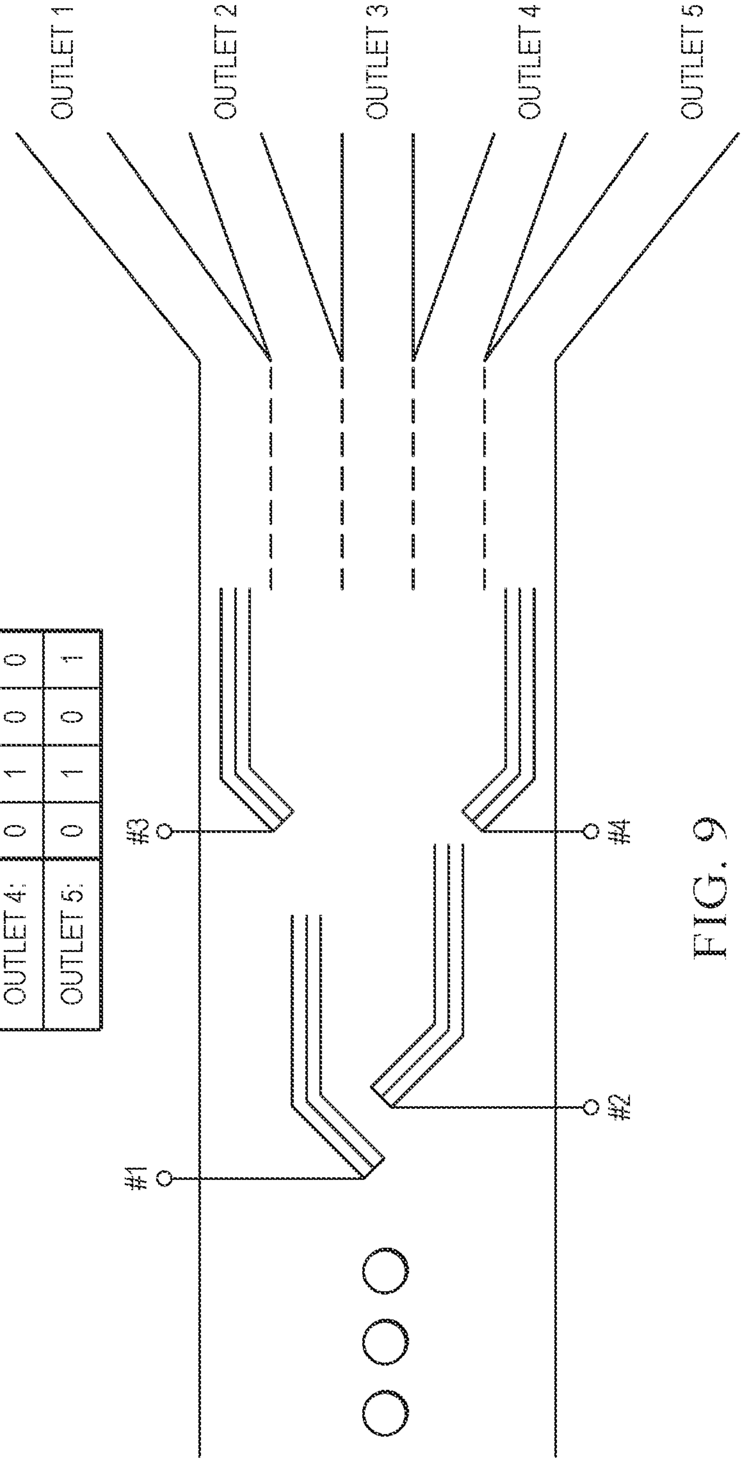
FIG. 9 illustrates a schematic of a 5-outlet IDE droplet sorter using the IDE system as a logic-controlled droplet guiding track array to sort droplets to different outlets by triggering cascading arrays of IDEs to achieve the droplet sorting towards a specific outlet (e.g., firing IDE #1 to IDE #3 sequentially to sort droplets to Outlet 1).

Application 5 (FIG. 9): IDE array for multi-outlet sorting. Sorting droplets into multiple outlets (more than one) may be desired for some applications. FIG. 9 shows an example of a 5-outlet droplet sorting application. Here, using a single IDE to sort droplets into 5 different outlets are difficult. By using an array of IDEs, where the droplet-guiding IDE tracks move the droplet flow from one outlet to the next one when the IDEs are sequentially actuated, highly accurate droplet manipulation into the desired outlet is possible.

The described multi-outlet droplet sorter has at least the following advantage of being a system that is the first of its kind that sorts droplets to one or more droplets using an array of IDEs.

Figure 10:
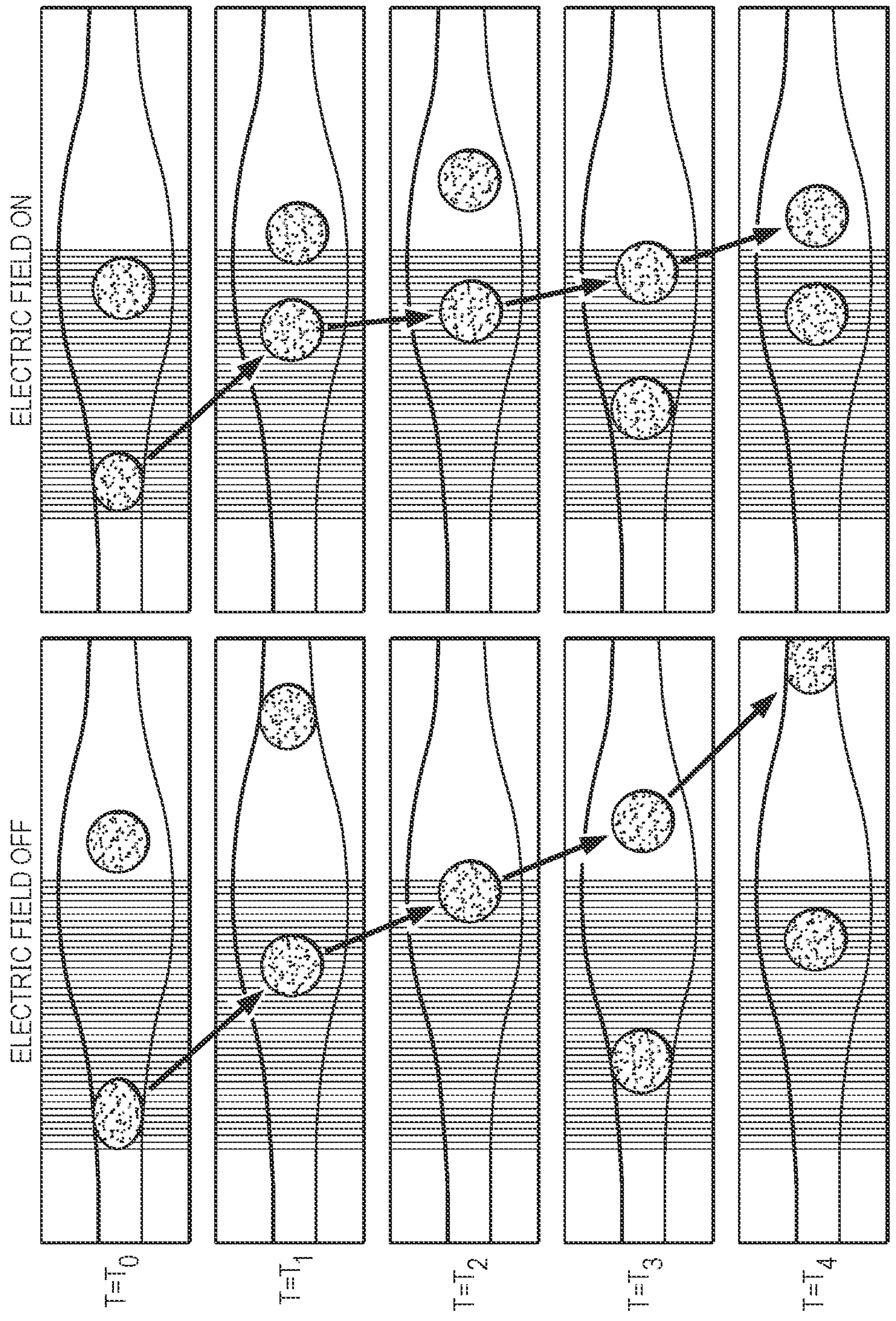
FIG. 10 illustrates frame-by-frame images of droplet speed control using an IDE droplet delay system. The left image panels show the droplet location in the expansion chamber at different time points when the EF is off. The right image panels show the droplet location in the expansion chamber at different time points when the EF is on, showing a reduction in speed while they are passing the IDE.

Application 6 (FIG. 10): IDE for control of the speed of droplets for improved droplet analyses. Fluorescence, luminescence, and spectroscopy-based analyses of droplets can benefit from a longer droplet dwelling time as the droplet passes through the analyses zone, especially when the detection signal from the droplet is relatively weak. However, lowering the flow speed of droplets to obtain higher signal strength results in lower throughput, which is not desired in high-throughput screening assays. The microfluidic devices of the present disclosure can locally control the speed of droplets at the droplet analyses zone to increase the droplet dwelling time while maintaining the overall speed of droplet through the system, thus not affecting the overall throughput of the system. The device can integrate an IDE underneath an expanded microchannel where droplet analyses occur. The expanded channel geometry constrains droplets from the x-axis, y-axis, and z-axis to only the z-axis. The IDE generates a localized DEP force that attracts droplets. Therefore, both the expanding microchannel and IDE-based slowing down of the droplet result in overall droplet speed reduction only in this region.

Figure 11:
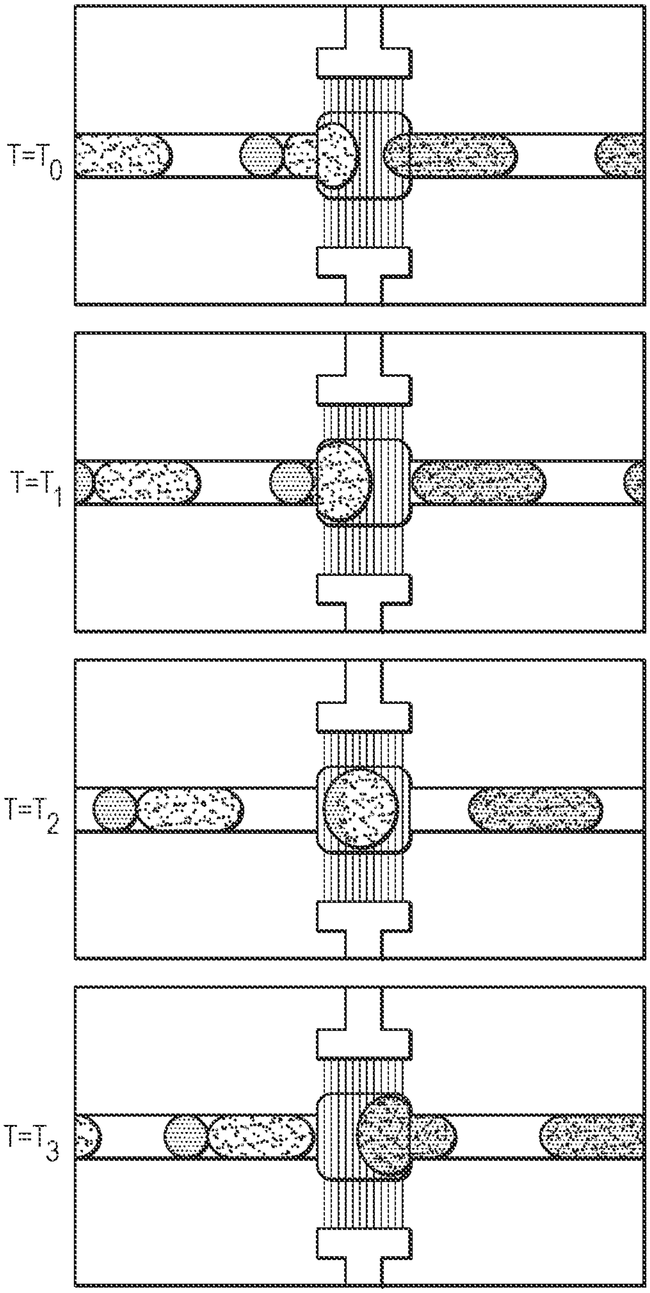
FIG. 11 illustrates frame-by-frame images of droplet merging using an IDE. Paired droplets are successfully merged under an IDE-localized electric field.

Application 7 (FIG. 11): IDE for control of the speed of droplets followed by droplet merging. To achieve highly efficient droplet merging, the two droplets to be merged together will have to first come in contact with each other. Using an expanding microchannel having an IDE underneath, as shown in Application 6, the first droplet coming into this zone is slowed down, and then collide with the following droplet coming into this zone. With the help of the collision-relaxation force induced from the contact of droplets, along with the DEP force generated by low-voltage IDE, paired droplet merging occurs.

The described IDE control of the speed of droplets and droplet merging (Applications 6 and 7) has at least the following advantages: (1) the droplet dwelling time is increased by at least 10 folds; (2) the overall droplet system throughput is maintained; and (3) high-throughput droplet-to-droplet merging with extremely low voltage (less than 10 V) is achieved.

In addition, the techniques and schemes described herein can be utilized in many different variations, as described in further detail below. For example, FIG. 8 and FIG. 9 can be considered as two variations of Application 1. That is, they both have slightly different microfluidics channel geometry.

Variation 1: Differences in IDE pattern geometry. The IDE width of each finger can be, but is not limited to, several microns, tens of microns, and hundreds of microns. The distance between fingers can be, but is not limited to, several microns to hundreds of microns. The distance between fingers can be, but is not limited to, equal, unequal, or positioned in a gradient. The IDE pattern can be, but is not limited to, straight, angled, or curved. The number of IDE fingers can be, but is not limited to, several pairs, tens of pairs, or hundreds of pairs.

Variation 2: Differences in IDE pattern number. One IDE pattern is needed for one guide track. For a multi-outlet sorting system, one fluidic device can incorporate multiple IDE-based droplet guiding tacks to achieve a multi-outlet sorter. For a size-based droplet filter system, one guide track is needed for a high-pass filter or low-pass filter, while two or more guide tracks are needed for a bandpass filter. For a droplet trapping system, one or more cascading guiding tracks are needed to move droplets to a desired location for trapping using a logic gate manipulation.

Variation 3: Differences in contents of the aqueous phase. The aqueous phase can contain, without limitation, biochemical reagents, large beads, large particles, cells, or gel droplets. Double emulsion (or more, i.e. triple, quadruple, core/shell, multicore, etc.) droplets can also be used.

Variation 4: Differences in fabrication materials and device scale. The fluidic layer and the substrate of the device can be fabricated using materials, such as but not limited to, poly dimethyl siloxane (PDMS), thermoplastic, silica, polymethyl methacrylate (PMMA), glass, and combinations of the same and like. The IDE part of the device can be made of, but not limited to, metal deposition, such as, for example Au, Cr, Ti, Ag, indium tin oxide (ITO), and combinations of the same and like. The size of the fabricated device, including the height and width of the fluidic channel, as well as the size of the IDE pattern, are decided by the reflow droplet size. The size of reflow droplets can be varied from, without limitation, several microns to hundreds of microns in diameters.

Variation 5: Differences in operation conditions. Different carrier oils, including oils that have heavier or lighter densities than the aqueous phase, are compatible with the presented systems. Examples include, but are not limited to, fluorinated oil and mineral oil. The phase differences include water-in-oil emulsions and oil-in-water emulsions, without limitation. For the size-dependent bandpass filter, if the case arises that the density of the carrier oil is lower than that of the aqueous solution, to maintain the filtration function, the IDE system needs to be located on top of the fluidic channel instead of on the bottom. The operation voltages can include, but are not limited to, several volts, tens of volts, or hundreds of volts. The operating frequencies can include, without limitation, 1 kHz, 10 kHz, and 100 kHz. The system can operate at different throughputs that can range from, without limitation, 1 droplet/see to 1000 droplets/sec. The system can operate with different numbers/types or combinations of signal detection units, including but not limited to, impedance detection, fluorescent detection, luminescence detection, colorimetric detection, absorption spectroscopy detection, and Raman spectroscopy detection.

Variation 6: Differences in fluidic channel geometry. The layout/number of fluidic channels, the number of inlet/outlets of fluidic channels, the arrangement of the fluidic channel and geometries, and the order/number of IDE manipulation compartments, can vary to achieve functions of the presented systems. Examples include, but are not limited to, increasing the number of sorting outlets and IDE manipulation patterns to achieve multi-terminal sorting. As demonstrated above, the guide track of the IDE enables the precise control of droplets and can be expanded to include larger or smaller droplets, which were previously unable to be sorted at a high efficiency. Additionally, the size-based filtration system utilizing buoyancy phenomenon, controlled channel height in the different regions of droplet manipulation microfluidic channel, and IDE-based droplet sorting systems allow the recovery of a certain size of droplets from a poly-dispersed droplet library. Moreover, the combination of size-based sorting and conventional fluorescent-activated sorting allows for the selection of droplets above the threshold of the droplet signal and correct droplet size range. Furthermore, the design of an IDE perpendicular to the fluidic channel allows the control of droplet speed as well as droplet merging when a pair of droplets make contact to culminate multiple forces together, enhancing the droplet merging efficiency.

Although various embodiments of the present disclosure have been illustrated in the accompanying drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines feature of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A droplet system for droplet manipulation, the droplet system, comprising:

at least one microfluidic channel or chamber; and at least one interdigitated electrode (IDE) that creates a localized electric field below or within at least one fluidic channel or chamber, wherein a series of IDEs are used to sort out droplets of a desired size range using a combination of one or more filters selected from the group consisting of highpass, lowpass, bandpass, and combinations thereof, wherein the droplet system utilizes multi-emulsion droplet schemes that lead to generation of double or more emulsion droplets.

2. The droplet system of claim 1, wherein the IDE comprises a material selected from the group consisting of Au, Ag, Ti, Cr, Cu, indium tin oxide (ITO), and combinations thereof.

3. The droplet system of claim 1, wherein operating voltages are in a range of several to hundreds of volts.

4. The droplet system of claim 1, wherein operating frequencies are in a range of 1 to 1,000 KHz.

5. The droplet system of claim 1, wherein the droplet system is operated at a variety of different throughputs ranging from 1 to 1,000 droplets/sec.

6. The droplet system of claim 1, wherein the at least one microfluidic channel or chamber has a shape selected from the group consisting of straight, curved, angled, and combinations thereof.

7. The droplet system of claim 1, wherein a height of the at least one fluidic channel or chamber is in a range of several to hundreds of microns.

8. The droplet system of claim 1, wherein a size of droplets to be manipulated varies in a range from several to hundreds of microns.

9. The droplet system of claim 1, wherein the at least one IDE is at least one of directly in contact or a proximity to a substance in the at least one fluidic channel or chamber.

10. The droplet system of claim 1, wherein the at least one IDE is at least one of directly exposed to a solution in the at least one fluidic channel or chamber, or coated by a repellent layer.

11. The droplet system of claim 10, wherein the repellent layer comprises a composition selected from the group consisting of a saline hydrophobic coating, $SiO_2$, $Si_3N_4$, and combinations thereof.

12. The droplet system of claim 1, wherein an aqueous phase comprises a composition selected from the group consisting of biochemical reagents, beads having a diameter that is equal to or smaller than a diameter of an encapsulated droplet, particles having a diameter that is equal to or smaller than a diameter of an encapsulated droplet, cells, gel droplets, and combinations thereof that are relatively close in diameter to an encapsulated droplet or smaller than the diameter to an encapsulated droplet.

13. The droplet system of claim 1, wherein the double or more emulsion droplets are selected from the group consisting of triple, quadruple, core/shell, multicore, and combinations thereof.

14. The droplet system of claim 1, wherein a system of microfluidic channels is comprised of at least one of a single layer of microfluidic channels or multiple layers of microfluidic channels stacked in any spatial direction with respect to a base plane.

15. The droplet system of claim 1, wherein there are any number of outlets for droplets to be sorted to.

16. The droplet system of claim 1, where microfluidic channel height changes for the different IDE-based droplet manipulation units along the microchannel so that size-based droplet manipulation is enabled.

17. The droplet system of claim 1, wherein a series of IDEs are used as a droplet diameter quality control system for at least one of droplet generation, droplet merging, droplet splitting, or in combination with any other droplet system.

18. The droplet system of claim 1, wherein an IDE or array of IDEs merge droplets that are passing the IDE in a fluidic channel or are stationary above the IDE.

19. The droplet system of claim 1, wherein an IDE or array of IDEs are used to slow, stop, or hold droplets that are passing or are positioned above the IDEs in a fluidic channel or chamber.

* * * * *